Oct. 15, 1957      B. L. TAYLOR      2,809,460
FISHING LURE RETRIEVER
Filed March 23, 1956
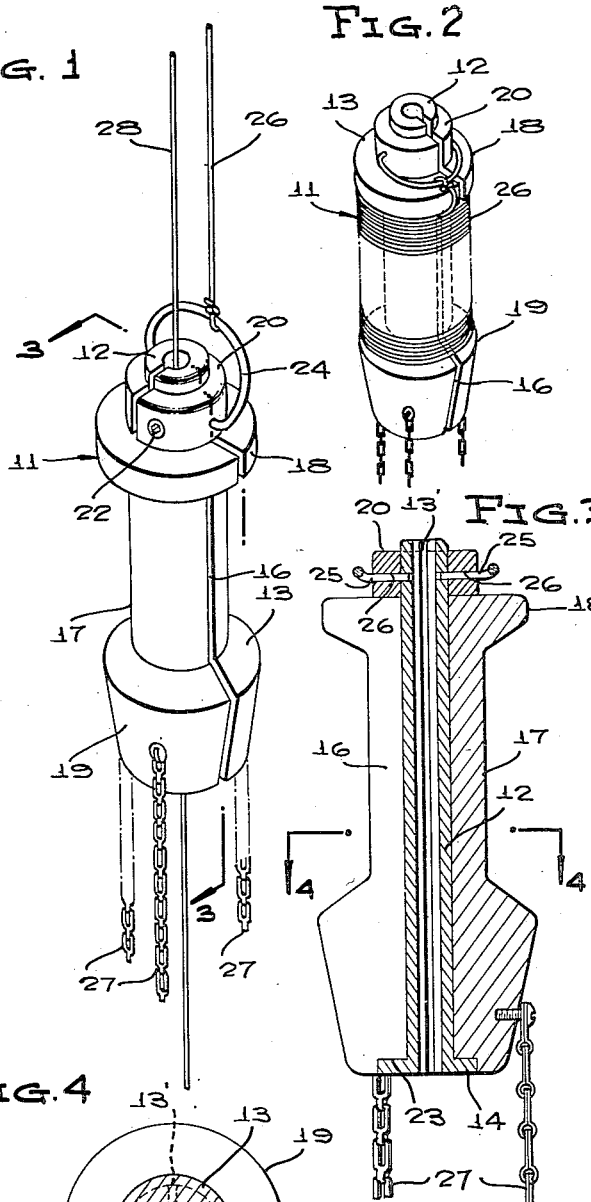
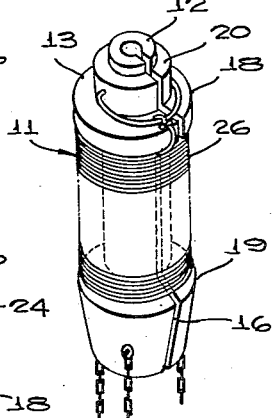
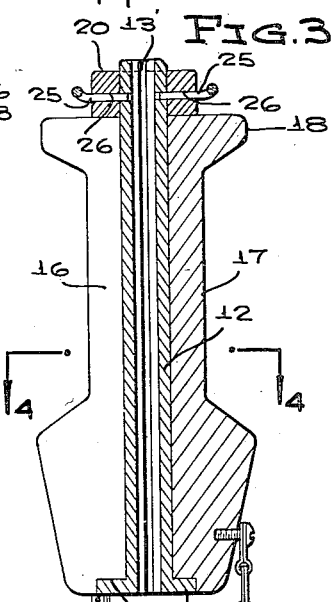
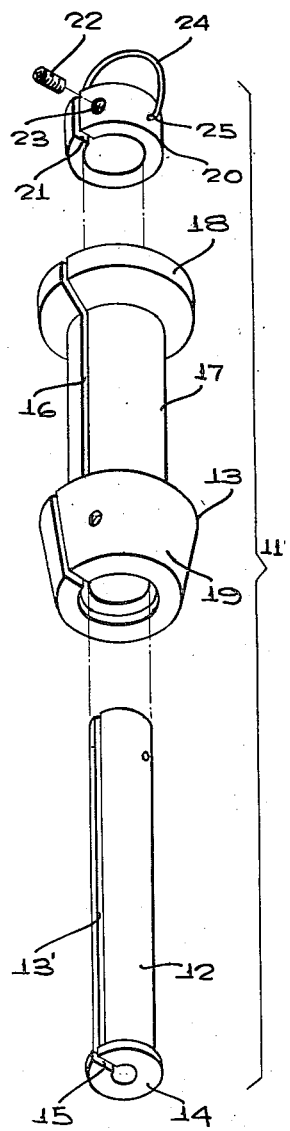
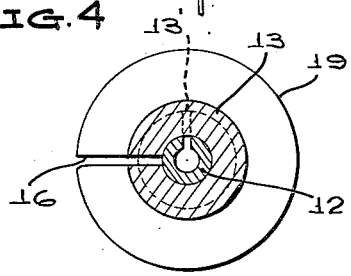
*INVENTOR.*
BELTY L. TAYLOR
BY
McMorrow, Berman & Davidson
ATTORNEYS

2,809,460
Patented Oct. 15, 1957

2,809,460
FISHING LURE RETRIEVER
Belty L. Taylor, Somerset, Ky.

Application March 23, 1956, Serial No. 573,454

1 Claim. (Cl. 43—17.2)

This invention relates to fishermen's equipment, and more particularly to a device for retrieving a fishing lure when it becomes entangled when submerged.

A main object of the invention is to provide a novel and improved fishing lure retriever which is simple in construction, which is easy to place on a fishing line when it is desired to retrieve a fishing lure which has become entangled, and which is arranged so that it may be stored in a readily usable condition.

A further object of the invention is to provide an improved fishing lure retriever which is inexpensive to manufacture, which is compact in size, and which is provided with improved means for placing the retriever on a fishing line and for securing the retriever on said line while it is being used to retrieve a fishing lure which has become entangled.

Further objects and advantages of the invention will become apparent from the following description and claims, and from the accompanying drawings, wherein:

Figure 1 is a perspective view of an improved fishing lure retriever according to the present invention, shown mounted on a fishing line in position for use.

Figure 2 is a perspective view of the fishing lure retriever of Figure 1 with its connecting line wound thereon, in a condition for storage.

Figure 3 is an enlarged vertical cross sectional view taken on the line 3—3 of Figure 1.

Figure 4 is a horizontal cross sectional view taken on the line 4—4 of Figure 3.

Figure 5 is a perspective view showing the components of the fishing lure retriever of Figures 1 to 4.

Referring to the drawings, the improved fishing lure retriever is designated generally at 11 and comprises a longitudinally slotted inner sleeve 12, said sleeve having a generally circular cross section and being provided with a longitudinal slot 13' extending for its full length, the sleeve being formed at one end with an enlarged flange 14 having a radial slot 15, registering with the longitudinal slot 13' of the sleeve 12. The sleeve 12 is telescopically engageable in a longitudinally slotted outer sleeve 13, said sleeve being slightly shorter than the inner sleeve 12 and having the longitudinal slot 16. The outer sleeve 13 is reduced in diameter at its intermediate portion, to define a spool core 17 and to define an annular flange 18 at one end and a collar 19 at its other end, the collar 19 being generally conical in shape and tapering toward the bottom end of the collar, as viewed in Figure 5.

As stated above, the outer sleeve 13 is substantially shorter than the inner sleeve 12, and the inner sleeve 12 is retained in the outer sleeve 13 by a collar 20 which is secured on the projecting end portion of sleeve 12, the collar 20 being formed with a radial slot 21 which is registered with the slot 13' in sleeve 12, the collar being rigidly secured to sleeve 12 by a set screw 22 engaged in a tapped opening 23 provided in the wall of the collar 20, as shown in Figure 5. Designated at 24 is a bail member having the inturned ends 25, 25 which are rotatably received in diametrically opposed apertures 26, 26 provided therefor in the collar 20, as shown in Figure 3. Connected to the bail member 24 is the flexible retriever line 26 which is adapted to be wound up on the reduced inner portion 17 of the outer sleeve 13 when the device is not in use, as shown in Figure 2.

Secured to the tapered lower end portion 19 of the outer sleeve 13 are a plurality of chain links 27, the chain links 27 being spaced around the circumference of the conical element 19, as shown in Figures 1 and 3. Thus, three chain links 27 may be employed, spaced at equal angles around the axis of the device.

In using the retriever, the flexible line 26 is first unwound and the fishing line, shown at 28, is engaged through the registering longitudinal slots 16 and 13' of the outer and inner sleeves. After the line 28 has been inserted through the slots 16 and 13', the inner sleeve 12 is rotated, by employing the collar 20 as a knob and by holding the outer sleeve 13, so that the slots 16 and 13' are not in registry. The device is then lowered along the fishing line 28 to a position adjacent the entangled lure, whereupon the retriever is agitated, by alternately pulling and releasing the retriever line 26, whereby the movement of the retriever, which is of substantial weight, and the oscillations of the chain links 27 serve to disentangle the lure and to release said lure so that it can be retrieved. After the lure is released, the retriever 11 is retracted and is removed from the fishing line 28, by first aligning the slot 16 with the slot 13', whereby the line 28 may be disengaged from the retriever. After the retriever 11 is disengaged from the fishing line 28, the retriever line 26 may be wound up on the spool core portion 17 and stored for future use.

As is clearly shown in Figure 3, the enlarged bottom flange 14 of the inner sleeve 12 is rotatably received in an annular recess 23' formed in the bottom end of the outer sleeve 13, the surface of the flange 14 being flush with the surface of the end portion 19, as illustrated.

As above mentioned, the outer sleeve 13 is of substantial weight so that when it is agitated by pulling on the line 26 and releasing said line, substantial turbulence is created around the entangled lure, and this turbulence, combined with the agitating action of the chain links 27 quickly disentangles the lure from the vegetation or other objects with which it may have become engaged.

While a specific embodiment of an improved fishing lure retriever has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A fishing lure retriever comprising a longitudinally slotted inner sleeve, a longitudinally slotted outer sleeve rotatably receiving said inner sleeve coaxially therewith, enlarged radially slotted abutment elements at the respective ends of the outer sleeve, annular stop means on the opposite end portions of the inner sleeve rotatably engageable with said abutment elements to retain the inner sleeve in the outer sleeve in all rotated positions of the inner sleeve relative to the outer sleeve, the slots in said abutment elements being aligned with the slot in said outer sleeve, whereby the slots of the sleeves may be at times registered to engage the sleeves on a fishing line, said sleeves being adjustable to positions wherein their slots are not in registry, so that the sleeves are slidable on a fishing line received in the inner sleeve, a U-shaped bail element pivotally connected to one end portion of said inner sleeve, a flexible cable element connected to said bail element, said outer sleeve being reduced in outside diameter with respect to said abutment elements over a substantial length of its intermediate portion to define a spool for at times receiving said flexible cable element, and a plurality of depending flexible agitating members on said outer sleeve.

References Cited in the file of this patent

UNITED STATES PATENTS

| | | |
|---|---|---|
| 2,001,241 | De Vries | May 14, 1935 |
| 2,482,037 | Swaim | Sept. 13, 1949 |
| 2,651,132 | Lennen | Sept. 8, 1953 |

FOREIGN PATENTS

| | | |
|---|---|---|
| 465,894 | France | Feb. 17, 1914 |